United States Patent
Singer et al.

(10) Patent No.: US 10,769,040 B2
(45) Date of Patent: Sep. 8, 2020

(54) LOGICAL EQUIVALENT REPLICATION WITH SNAPSHOT BASED FALLBACK OF DATABASE SYSTEMS

(71) Applicant: SAP SE, Walldorf (DE)

(72) Inventors: Reiner Singer, Schriesheim (DE); Werner Thesing, Lautertal (DE)

(73) Assignee: SAP SE, Walldorf (DE)

( * ) Notice: Subject to any disclaimer, the term of this patent is extended or adjusted under 35 U.S.C. 154(b) by 329 days.

(21) Appl. No.: 15/357,689

(22) Filed: Nov. 21, 2016

(65) Prior Publication Data

US 2018/0143881 A1 May 24, 2018

(51) Int. Cl.
*G06F 11/00* (2006.01)
*G06F 11/16* (2006.01)
*G06F 11/20* (2006.01)

(52) U.S. Cl.
CPC ...... *G06F 11/1658* (2013.01); *G06F 11/2094* (2013.01); *G06F 11/2097* (2013.01); *G06F 2201/80* (2013.01); *G06F 2201/855* (2013.01)

(58) Field of Classification Search
CPC ............ G06F 11/1471; G06F 11/1474; G06F 11/1658; G06F 11/2023; G06F 11/2025; G06F 11/2028; G06F 11/203; G06F 11/2082; G06F 11/2092; G06F 11/2094; G06F 11/2097
See application file for complete search history.

(56) References Cited

U.S. PATENT DOCUMENTS

| | | | | |
|---|---|---|---|---|
| 7,389,300 B1* | 6/2008 | Shah | ............ | G06F 11/1482 |
| 7,565,572 B2* | 7/2009 | Yamasaki | ............ | G06F 11/2082 714/6.1 |
| 8,020,037 B1* | 9/2011 | Schwartz | ............ | G06F 11/2094 714/41 |
| 8,291,269 B1* | 10/2012 | Ro | ............ | G06F 17/30607 707/823 |
| 8,504,873 B1* | 8/2013 | Deolasee | ............ | G06F 11/1471 714/15 |
| 8,874,508 B1* | 10/2014 | Mittal | ............ | G06F 11/2097 707/610 |
| 9,632,892 B1* | 4/2017 | Sledz | ............ | G06F 16/178 |
| 9,870,412 B2* | 1/2018 | Ghosh | ............ | G06F 11/2025 |
| 10,002,175 B2* | 6/2018 | Kemper | ............ | G06F 16/28 |
| 2004/0010502 A1* | 1/2004 | Bomfim | ............ | G06F 16/2365 |
| 2008/0172572 A1* | 7/2008 | Beardsley | ............ | G06F 11/2069 714/6.12 |
| 2009/0044046 A1* | 2/2009 | Yamasaki | ............ | G06F 11/2082 714/6.1 |

(Continued)

*Primary Examiner* — Elmira Mehrmanesh
(74) *Attorney, Agent, or Firm* — Jones Day

(57) ABSTRACT

A computer implemented method for replication includes registering a first database system with a second database system and performing a failback operation on the first database system. The failback operation includes opening a snapshot that includes data known to have existed on the first database system and the second database system at a first time. Transaction log information is requested from the second database system. The transaction log information corresponds to transactions performed on the second database system beginning with the first time. The transaction log information is applied to the snapshot data on the first database system. Related apparatus, systems, techniques and articles are also described.

20 Claims, 7 Drawing Sheets

(56) References Cited

U.S. PATENT DOCUMENTS

| | | | |
|---|---|---|---|
| 2010/0192008 A1* | 7/2010 | Beardsley | G06F 11/2069 714/6.12 |
| 2012/0166490 A1* | 6/2012 | Raatikka | G06F 17/30312 707/797 |
| 2014/0172803 A1* | 6/2014 | Diaconu | G06F 17/30088 707/649 |
| 2014/0258659 A1* | 9/2014 | Petersen | G06F 3/065 711/162 |
| 2015/0019494 A1* | 1/2015 | Griffith | G06F 11/1458 707/649 |
| 2015/0142739 A1* | 5/2015 | Mutalik | G06F 17/30162 707/613 |
| 2015/0200818 A1* | 7/2015 | Winkelstrater | G06F 11/2038 709/223 |
| 2015/0317212 A1* | 11/2015 | Lee | G06F 11/2038 707/685 |
| 2015/0339366 A1* | 11/2015 | Laiho | G06F 17/30575 707/610 |
| 2016/0306717 A1* | 10/2016 | Li | G06F 11/1471 |
| 2016/0306719 A1* | 10/2016 | Laicher | G06F 11/203 |
| 2016/0328303 A1* | 11/2016 | Brandner | G06F 11/1662 |
| 2017/0046234 A1* | 2/2017 | Yang | G06F 11/1464 |
| 2017/0185323 A1* | 6/2017 | Kaushik | G06F 11/1469 |
| 2018/0074909 A1* | 3/2018 | Bishop | G06F 11/1451 |

* cited by examiner

US 10,769,040 B2

LOGICAL EQUIVALENT REPLICATION WITH SNAPSHOT BASED FALLBACK OF DATABASE SYSTEMS

TECHNICAL FIELD

The subject matter described herein relates to a failback operation for restoring operation of a second database system that is a logically equivalent replication of a first database system using a snapshot.

BACKGROUND

Database systems rely on data replication and synchronization to maintain continuous system availability. Typically, in such a system, a complete copy of the database is stored at a first database system and the same complete copy of the database is stored at a second database system. The first and second database systems may be in different locations. Since the data in the second database system needs to be the same as the data in the first database system, a synchronization mechanism is typically employed to handle synchronization of the data. If there is a failure associated with the first database system, the overall system can switch to using the second database system without significant issues.

Since the second database system may be asked to perform all of the same tasks as the first database system, typically, the second database system has the same hardware and software requirements as the first database system. Sometimes more than two database systems may be included within the overall system.

SUMMARY

In some aspects, replicating a database system includes registering a first database system with a second database system and performing a failback operation on the first database system. The failback operation may include opening a snapshot that includes data known to have existed on the first database system and the second database system at a first time. Transaction log information may be requested from the second database system. The transaction log information corresponds to transactions performed on the second database system beginning with the first time. The transaction log may include transactions through a current time. The transaction log information may be applied to the snapshot data on the first database system.

The first database system may include multiple snapshots and the opened snapshot may be the most recent snapshot stored on the first database system.

In some aspects, the snapshot may be retrieved from a persistent storage and saved to a main memory located within the first database system.

In some aspects, after the transaction log information is applied to the snapshot data on the first database system, the data on the first database system may be logically equivalent to data on the second database system but physically different from data on the second database system.

If the first database system registers as a new secondary database system, the second database system may become the primary database system. The second database system may become the primary database system at a second time after the first time. In some embodiments, transactions on the first database system that occurred after the second time may be lost after performing the failback operation.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods may be implemented by one or more data processors either within a single computing system or distributed among two or more computing systems. Such computing systems may be connected and may exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the failback operation described herein may result in faster restoration of a database system after restart and/or failure. In some embodiments, by using an available snapshot, the second database can be restored to an operational state without having to receive a full copy of the data from the first database system. In some embodiments, the methods described herein may also improve recovery times after a system restart or recovery.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
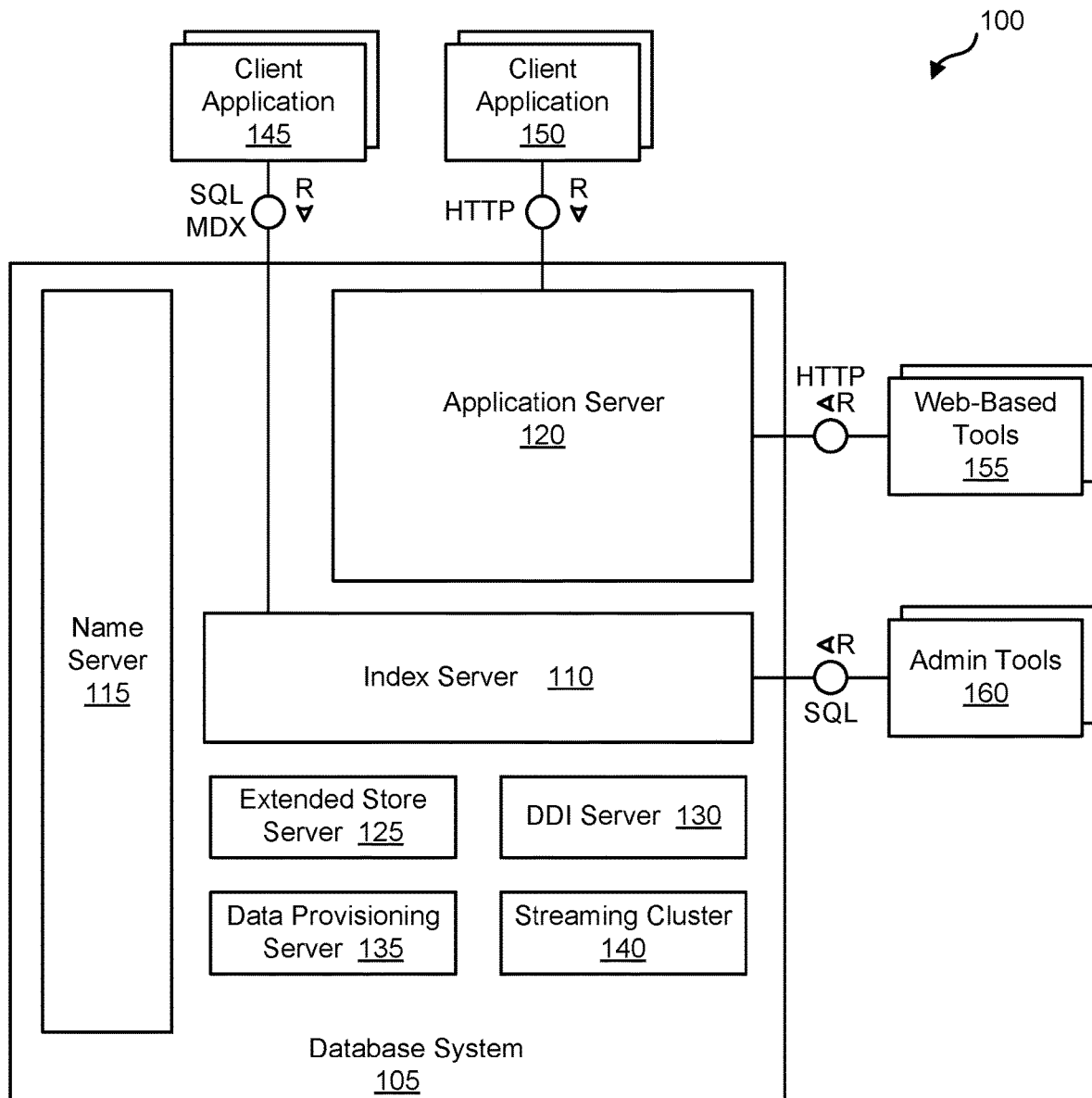
FIG. 1 is a system diagram illustrating an example database system for use in connection with the current subject matter.

A database or database system may be represented as a table or a set of tables containing data in rows and/or columns. In a row based database, data in a table may be stored and organized by rows. Alternatively, data in a table may also be stored and organized by columns and such a database is called a column oriented database or a columnar database. Column oriented databases typically make more efficient use of storage by replacing redundant data with a pointer. One example of a database system is SAP HANA®. SAP HANA® is a column oriented relational database system. SAP HANA® is also an in memory database (IMDB) in which the data associated with the database is stored in main memory instead of a disk storage (persistent memory) so it may be accessed more quickly. IMDB systems are generally column oriented databases since column oriented databases make more efficient use of the expensive main memory. In some situations, persistent memory may be used to store certain data (e.g., data that is not used as frequently or has not been used in some time).

Some databases may utilize replication to improve reliability and availability of the database. If data replication is implemented, the database system may include a first database system and a second database system. The first database system may include a processor and memory sufficient to store the data associated with the database. The first database system may store a first (primary) copy of the data associated with the database. The second database system may also include a processor and memory sufficient to store the data associated with the database. The second database system may store a second (backup) copy of the data associated with the database.

To better utilize the second database system, some database systems, such as SAP HANA®, may simultaneously utilize the first database system and the second database system. In this mode of operation, the first database system may be configured to delegate certain queries to the second database system to balance the load between the two systems. Such a situation may be referred to as Active/Active (AA) operation since the first database system and the second database system both actively respond to queries at the same time.

Since the first database system and the second database system are both responding to queries at the same time, it may be desirable to implement a replication procedure that ensures the data in the secondary database is current with the data in the primary database. If the data between the two database systems is not current, inconsistent responses to client queries may be generated. In some embodiments, it may not be desirable to send actual data objects from the primary database system to the secondary database system to update the secondary database system. Accordingly, changes to the primary database system may be communicated to the secondary database system via a transaction log. In this case, the data stored in the primary database and the secondary database may be physically different but logically equivalent.

FIG. 1 is a diagram 100 illustrating a database system 105 that may be used to implement aspects of the current subject matter. The database system 105 may, for example, be an in-memory database in which all relevant data is kept in main memory so that read operations may be executed without disk I/O operations which are required by disk storage to make any changes durable. The database system 105 may include a plurality of servers including, for example, one or more of an index server 110, a name server 115, and/or an application server 120. The database system 105 may also include one or more of an extended store server 125, a database deployment infrastructure (DDI) server 130, a data provisioning server 135, and/or a streaming cluster 140. The database system 105 may be accessed by a plurality of remote clients 145, 150 via different protocols such as SQL/MDX (e.g., by way of the index server 110) and/or web-based protocols such as HTTP (e.g., by way of the application server 120).

The index server 110 may contain in-memory data stores and engines for processing data. The index server 110 may also be accessed by remote tools (e.g., via, for example, SQL queries), that may provide various development environment and administration tools. Additional details regarding an example implementation of the index server 110 are described and illustrated in connection with diagram 300 of FIG. 3.

The name server 115 may own information about the topology of the database system 105. In a distributed database system, the name server 115 may know where various components are running and which data is located on which server. In a database system 105 with multiple database containers, the name server 115 may have information about existing database containers and it may also host the system database. For example, the name server 115 may manage the information about existing tenant databases. Unlike a name server 115 in a single-container system, the name server 115 in a database system 105 having multiple database containers may not store topology information such as the location of tables in a distributed database. In a multi-container database system 105 such database-level topology information may be stored as part of the catalogs of the tenant databases.

The application server 120 may enable native web applications used by one or more remote clients 150 accessing the database system 105 via a web protocol such as HTTP. The application server 120 may allow developers to write and run various database applications without the need to run an additional application server. The application server 120 may also be used to run web-based tools 155 for administration, life-cycle management, and development. Other administration and development tools 160 may directly access the index server 110 for, example, via SQL and other protocols.

The extended store server 125 may be part of a dynamic tiering option that may include a high-performance disk-based column store for very big data up to the petabyte range and beyond. Less frequently accessed data (for which is it non-optimal to maintain in main memory of the index server 110) may be put into the extended store server 125. The dynamic tiering of the extended store server 125 allows for hosting of very large databases with a reduced cost of ownership as compared to conventional arrangements.

The DDI server 130 may be a separate server process that is part of a database deployment infrastructure (DDI). The DDI may be a layer of the database system 105 that simplifies the deployment of database objects using declarative design time artifacts. DDI may ensure a consistent deployment, for example by guaranteeing that multiple objects are deployed in the right sequence based on dependencies, and by implementing a transactional all-or-nothing deployment.

The data provisioning server 135 may provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (e.g., data feeds, etc.) to be utilized by the database system 105. The streaming cluster 140 allows for both consumption of data streams and for complex event processing.

Figure 2:
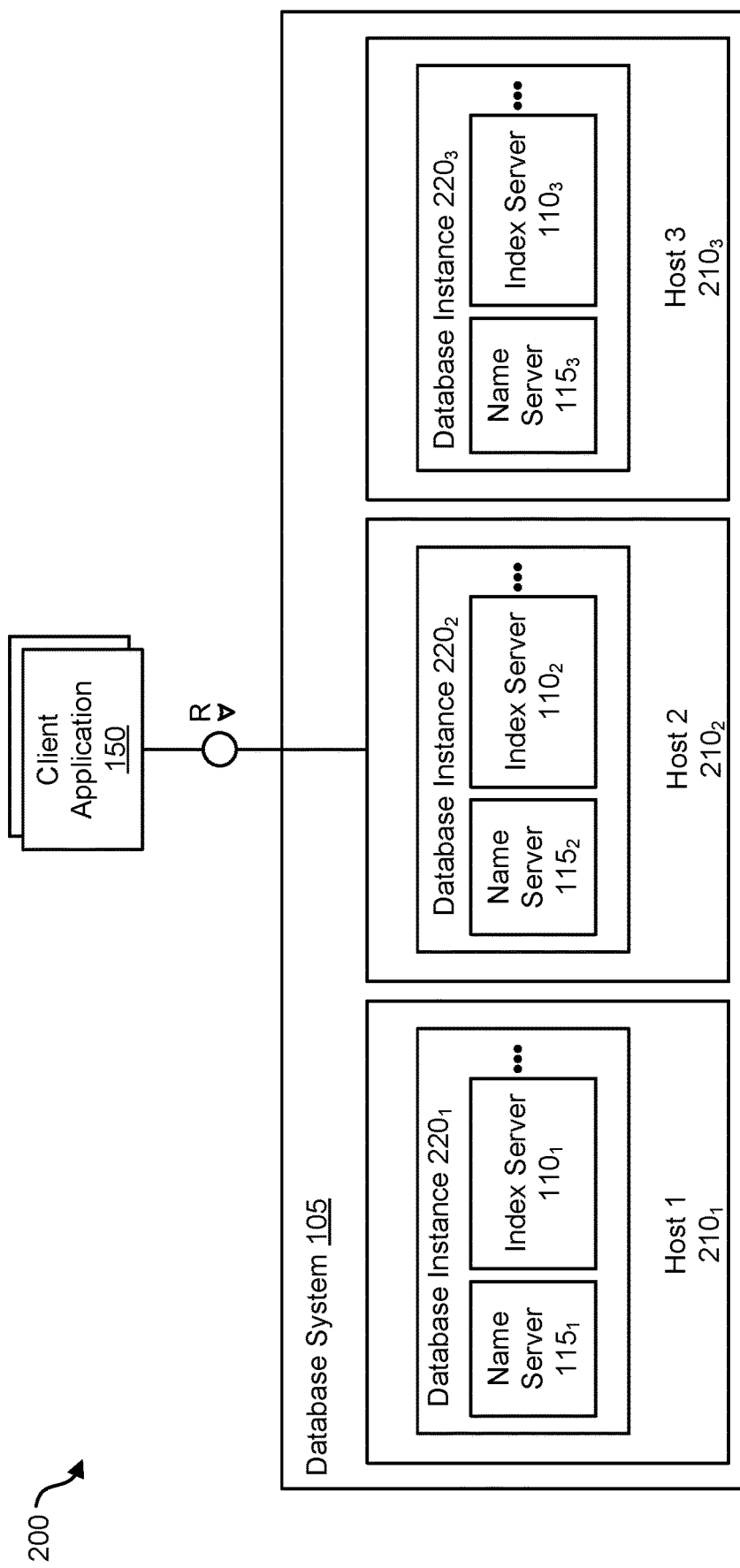
FIG. 2 is a system diagram illustrating a distributed database system having a plurality of database instances.

FIG. 2 is a diagram 200 illustrating a variation of the database system 105 that may support distribution of server components across multiple hosts for scalability and/or availability purposes. This database system 105 may, for example, be identified by a single system ID (SID) and it may be perceived as one unit from the perspective of an administrator, who may install, update, start up, shut down, or backup the system as a whole. The different components of the database system 105 may share the same metadata, and requests from client applications 150 may can be transparently dispatched to different servers $110_{1-3}$, $120_{1-3}$, in the system, if required.

As is illustrated in FIG. 2, the distributed database system 105 may be installed on more than one host $210_{1-3}$. Each host $210_{1-3}$ is a machine that may comprise at least one data processor (e.g., a CPU, etc.), memory, storage, a network interface, and an operation system and which executes part of the database system 105. Each host $210_{1-3}$ may execute a database instance $220_{1-3}$ which comprises the set of components of the distributed database system 105 that are installed on one host $210_{1-3}$. FIG. 2 shows a distributed system with three hosts, which each run a name server $115_{1-3}$, index server $110_{1-3}$, and so on (other components are omitted to simplify the illustration).

Figure 3:
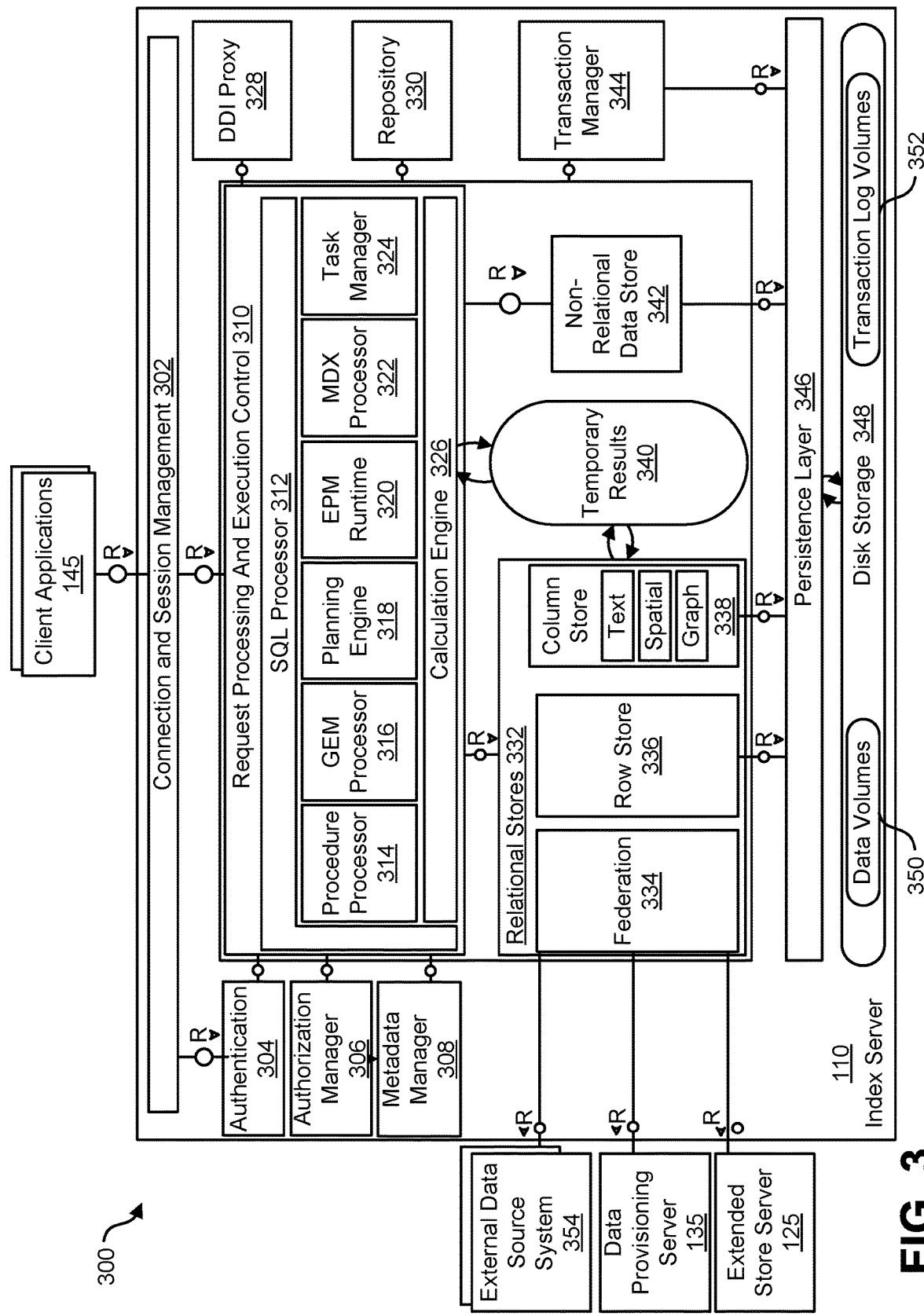
FIG. 3 is a system diagram of an index server forming part of the database system of FIG. 1.

FIG. 3 is a diagram 300 illustrating an architecture for the index server 110 (which may, as indicated above, be one of many instances). A connection and session management component 302 may create and manage sessions and connections for the client applications 145. For each session, a set of parameters may be maintained such as, for example, auto commit settings or the current transaction isolation level.

Requests from the client applications 145 may be processed and executed by way of a request processing and execution control component 310. The database system 105 offers rich programming capabilities for running application-specific calculations inside the database system. In addition to SQL, MDX, and WIPE, the database system 105 may provide different programming languages for different use cases. SQLScript may be used to write database procedures and user defined functions that may be used in SQL statements. L language may be used to implement operator logic that may be called by SQLScript procedures and for writing user-defined functions.

Once a session is established, client applications 145 typically use SQL statements to communicate with the index server 110 which may be handled by a SQL processor 312 within the request processing and execution control component 310. Analytical applications may use the multidimensional query language MDX (MultiDimensional eXpressions) via an MDX processor 322. For graph data, applications may use GEM (Graph Query and Manipulation) via a GEM processor 316, a graph query and manipulation language. SQL statements and MDX queries may be sent over the same connection with the client application 145 using the same network communication protocol. GEM statements may be sent using a built-in SQL system procedure.

The index server 110 may include an authentication component 304 that may be invoked when a new connection with a client application 145 is established. Users may be authenticated either by the database system 105 itself (login with user and password) or authentication may be delegated to an external authentication provider. An authorization manager 306 may be invoked by other components of the database system 105 to check whether the user has the required privileges to execute the requested operations.

Statements may be processed in the context of a transaction. New sessions may be implicitly assigned to a new transaction. The index server 110 may include a transaction manager 344 that coordinates transactions, controls transactional isolation, and keeps track of running and closed transactions. When a transaction is committed or rolled back, the transaction manager 344 may inform the involved engines about this event so they may execute necessary actions. The transaction manager 344 may provide various types of concurrency control and it may cooperate with a persistence layer 346 to achieve atomic and durable transactions.

Incoming SQL requests from the client applications 145 may be received by the SQL processor 312. Data manipulation statements may be executed by the SQL processor 312 itself. Other types of requests may be delegated to the respective components. Data definition statements may be dispatched to a metadata manager 306, transaction control statements may be forwarded to the transaction manager 344, planning commands may be routed to a planning engine 318, and task related commands may forwarded to a task manager 324 (which may be part of a larger task framework) Incoming MDX requests may be delegated to the MDX processor 322. Procedure calls may be forwarded to the procedure processor 314, which further dispatches the calls, for example to a calculation engine 326, the GEM processor 316, a repository 300, or a DDI proxy 328.

The index server 110 may also include a planning engine 318 that allows planning applications, for instance for financial planning, to execute basic planning operations in the database layer. One such basic operation is to create a new version of a data set as a copy of an existing one while applying filters and transformations. For example, planning data for a new year may be created as a copy of the data from the previous year. Another example for a planning operation is the disaggregation operation that distributes target values from higher to lower aggregation levels based on a distribution function.

The SQL processor 312 may include an enterprise performance management (EPM) runtime component 320 that may form part of a larger platform providing an infrastructure for developing and running enterprise performance management applications on the database system 105. While the planning engine 318 may provide basic planning operations, the EPM platform provides a foundation for complete planning applications, based on application-specific planning models managed in the database system 105.

The calculation engine 326 may provide a common infrastructure that implements various features such as SQLScript, MDX, GEM, tasks, and planning operations. The SQLScript processor 312, the MDX processor 322, the planning engine 318, the task manager 324, and the GEM processor 316 may translate the different programming languages, query languages, and models into a common representation that is optimized and executed by the calculation engine 326. The calculation engine 326 may implement those features using temporary results 340 which may be based, in part, on data within the relational stores 332.

Metadata may be accessed via the metadata manager component 308. Metadata, in this context, may comprise a variety of objects, such as definitions of relational tables, columns, views, indexes and procedures. Metadata of all these types may be stored in one common database catalog for all stores. The database catalog may be stored in tables in a row store 336 forming part of a group of relational stores 332. Other aspects of the database system 105 including, for example, support and multi-version concurrency control may also be used for metadata management. In distributed systems, central metadata may be shared across servers and the metadata manager 308 may coordinate or otherwise manage such sharing.

The relational stores 332 form the different data management components of the index server 110 and these relational stores may, for example, store data in main memory. The row store 336, a column store 338, and a federation component 334 are all relational data stores which may provide access to data organized in relational tables. The column store 338 may store relational tables column-wise (i.e., in a column-oriented fashion, etc.). The column store 338 may also comprise text search and analysis capabilities, support for spatial data, and operators and storage for graph-structured data. With regard to graph-structured data, from an application viewpoint, the column store 338 may be viewed as a non-relational and schema-flexible in-memory data store for graph-structured data. However, technically such a graph store is not a separate physical data store. Instead it is built using the column store 338, which may have a dedicated graph API.

The row store 336 may store relational tables row-wise. When a table is created, the creator may specify whether it should be row or column-based. Tables may be migrated between the two storage formats. While certain SQL extensions are only available for one kind of table (such as the "merge" command for column tables), standard SQL may be used on all tables. The index server 110 also provides functionality to combine both kinds of tables in one statement (join, sub query, union).

The federation component 334 may be viewed as a virtual relational data store. The federation component 334 may provide access to remote data in external data source system(s) 354 through virtual tables, which may be used in SQL queries in a fashion similar to normal tables.

The database system 105 may include an integration of a non-relational data store 342 into the index server 110. For example, the non-relational data store 342 may have data represented as networks of C++ objects, which may be persisted to disk. The non-relational data store 342 may be used, for example, for optimization and planning tasks that operate on large networks of data objects, for example in supply chain management. Unlike the row store 336 and the column store 338, the non-relational data store 342 does not use relational tables; rather, objects may be directly stored in containers provided by the persistence layer 346. Fixed size entry containers may be used to store objects of one class. Persisted objects may be loaded via their persisted object IDs, which may also be used to persist references between objects. In addition, access via in-memory indexes is supported. In that case, the objects need to contain search keys. The in-memory search index is created on first access. The non-relational data store 342 may be integrated with the transaction manager 344 to extend transaction management with sub-transactions, and to also provide a different locking protocol and implementation of multi version concurrency control.

An extended store is another relational store that may be used or otherwise form part of the database system 105. The extended store may, for example, be a disk-based column store optimized for managing very big tables, which may not be desirable to keep in memory (as with the relational stores 332). The extended store may run in an extended store server 125 separate from the index server 110. The index server 110 may use the federation component 334 to send SQL statements to the extended store server 125.

The persistence layer 346 is responsible for durability and atomicity of transactions. The persistence layer 346 may ensure that the database system 105 is restored to the most recent committed state after a restart and that transactions are either completely executed or completely undone. To achieve this goal in an efficient way, the persistence layer 346 may use a combination of write-ahead logs, shadow paging and savepoints. The persistence layer 346 may provide interfaces for writing and reading persisted data and it may also contain a logger component that manages a transaction log. Transaction log entries can be written explicitly by using a log interface or implicitly when using the virtual file abstraction.

The persistence layer 346 stores data in persistent disk storage 348 which, in turn, may include data volumes 350 and/or transaction log volumes 352 that may be organized in pages. Different page sizes may be supported, for example, between 4 k and 16M. Data may be loaded from the disk storage 348 and stored to disk page wise. For read and write access, pages may be loaded into a page buffer in memory. The page buffer need not have a minimum or maximum size, rather, all free memory not used for other things may be used for the page buffer. If the memory is needed elsewhere, least recently used pages may be removed from the cache. If a modified page is chosen to be removed, the page first needs to be persisted to disk storage 348. While the pages and the page buffer are managed by the persistence layer 346, the in-memory stores (i.e., the relational stores 332) may access data within loaded pages.

In some applications, database systems may be required to support operations on a 24/7 schedule, and data system providers may be required to guarantee a maximum amount of downtime, that is time during which a system is not able to fully support ongoing operations. When a system is required to ensure an agreed level of operational performance, it may be referred to as a high availability ("HA") system. As discussed above, one solution to guarantee substantially continuous uptime with no, or very little, downtime is to maintain one or more hot-standby systems (sometimes referred to as a secondary database system or a back-up system). A hot-standby system is a system that may be activated quickly in the event of a disruption causing one or more functions of a primary operational data system to fail. Such a disruption may be referred to as a disaster, and the process of restoring a data system to full operations may be referred to as disaster-recovery ("DR").

In some embodiments, the secondary database system may be an exact replica of a primary operational database system that is capable of providing all or substantially all of the functions provided by the primary database system. Alternatively, the secondary system may be a system that is capable of providing a minimum amount of essential functionality during the time required to restore the primary database system. The time it takes after a disaster to restore full, or minimum, functionality of a database system, for example by bringing the secondary database system online, is referred to as recovery time. In an effort to minimize recovery time, and thereby downtime, a hot-standby system is typically in a state just short of fully operational. For example, a system architecture may be implemented in which all functional systems of the secondary database system are active and operational, and all system and data changes or updates occur in the primary database system and the secondary database system at the exact same time. In such a case the only difference in the two systems may be that the primary is configured to respond to user requests and the secondary is not. In other systems one or more functions may be disabled until mission critical systems of the secondary database system are observed to be operating normally, at which time the remaining functions may be brought online.

In some applications, database systems may be required to provide prompt responses to users and applications that rely on the data managed by the database system. Providers and designers of database systems may be required to guarantee a minimum average throughput over time, or an average maximum response time. The speed with which a database system responds to a request from a user or an application may be dependent on many factors, but, in general, systems are limited in the number of requests they can handle in a given period of time. When a database system manages a relatively large amount of data, and supports a relatively large number of users or applications, during high workloads a request may be queued, buffered or rejected until sufficient system resources are available to complete the request. When this happens, average throughput goes down and average response time goes up. One solution to such a problem is to distribute the workload across multiple processing systems. This is known as load balancing.

One drawback to load balancing and HA systems is that they may require additional processing systems, which in turn have a high cost. It is often the case with certain database systems supporting critical functions of an organization that additional systems are needed to perform both load balancing and HA functionality to efficiently support continuous operations. Given the redundant nature of DR systems, they are often left undisturbed unless a disaster occurs. Thus, in some circumstances, it is desirable to implement and maintain a combination high availability/disaster recovery (HA/DR) system with load balancing that includes both a primary database system and a secondary (hot-standby) database system, and potentially one or more tertiary systems. Such a combination system allows for load balancing of workload between the processing systems of both the primary database system and the secondary database system, without disrupting the ability of the HA/DR system to assume primary functionality in the event of a disaster.

Figure 4:
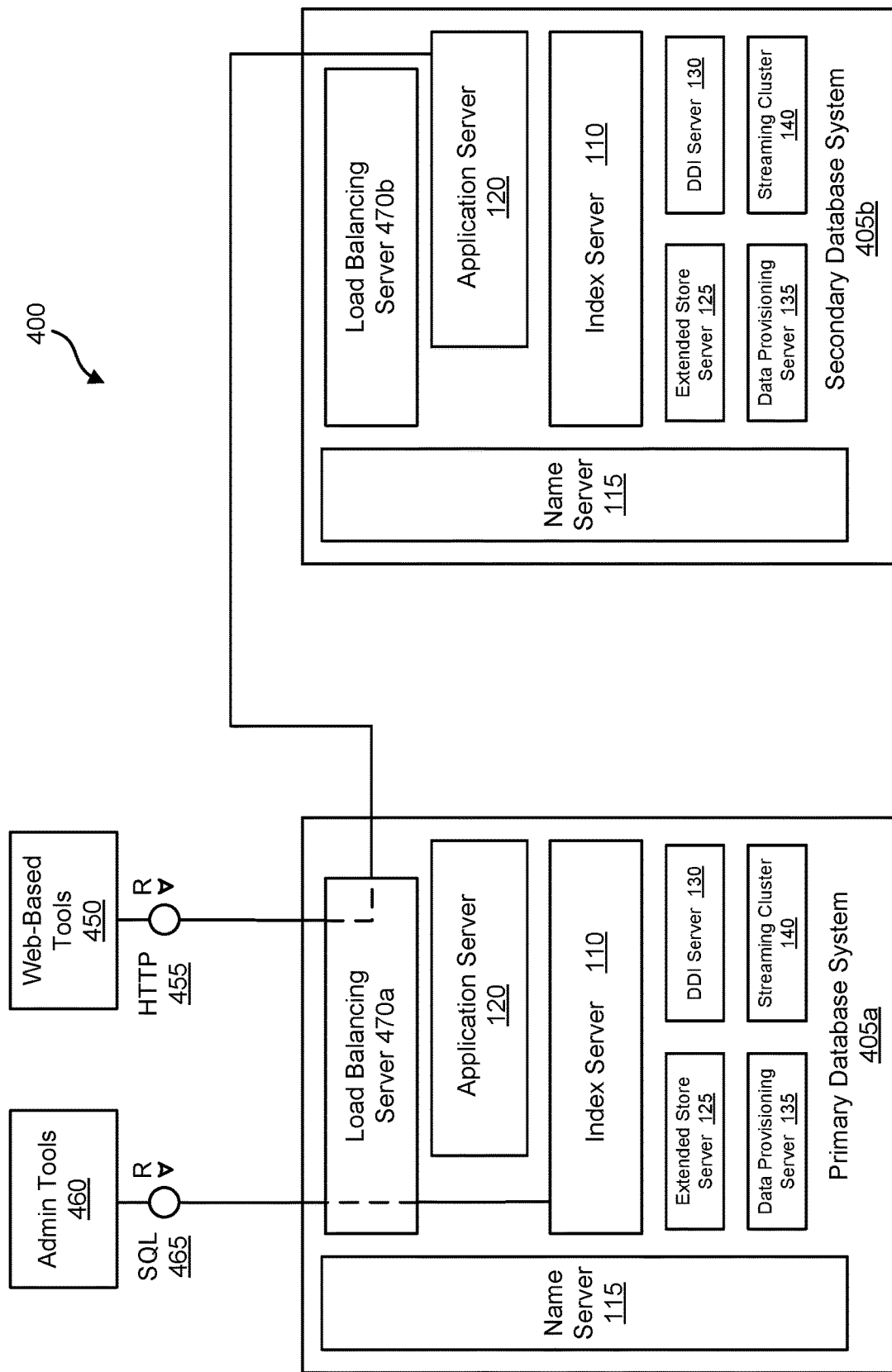
FIG. 4 is a system diagram illustrating an architecture to support load balancing between a primary database system and a secondary database system.

FIG. 4 is a functional flow diagram illustrating an architecture 400 to support load balancing between a primary database system 405a and a secondary database system 405b, which serves as a hot-standby to primary database system 405a. Both the primary database system 405a and the secondary system 405b may be a single instance system, similar to database system 105 depicted in FIG. 1, or each may be a distributed variation of database system 105 as depicted in FIG. 2. Such an architecture 400 may be useful in a high availability data system, or in a disaster recovery system, or in a combination HA/DR system.

Each of the primary database system 405a and secondary database system 405b may include a load balancing functionality. Such load balancing functionality may for example be contained within a distinct load balancing server 470a or 470b. But, such load balancing functionality may be managed by any suitable processing system. For example, the application server 120 of the primary system may also manage the load balancing of requests issued to the application server of the primary database system 405a, sending requests to the secondary database system 405b as necessary to maintain a well distributed workload.

As depicted in FIG. 4, each of the primary database system 405a and the secondary database system 405b includes a load balancing server 470a and 470b which respectively receive requests from user applications directed to the primary database system 405a or the secondary database system 405b. Such request may come from either admin tools 460 or web-based tools 450, or any other user application. Upon receiving a request a load balancing server, e.g. 470a, determines how to distribute the workload. As depicted load balancing server 470a routes an SQL request 465 from admin tools 460 to the index server 110 of the primary database system 405a, while routing an HTTP request 455 from web-based tools 450 to the application server 120 of the secondary database system 405b.

Load balancing of resources between a primary database system 405a and a secondary database system 405b may give rise to a number of complicating issues. For example, if either of the requests 455, 465 requires writing to one or more data tables, or modifying a data table, then the two database systems 405a, 405b will diverge. After many instances of write requests being distributed between the primary database system 405a and the secondary database system 405b, the two systems would be substantially different, and likely unusable. In another example, an application request, e.g. 465, may perform a write transaction that is followed by a read transaction, e.g. 455, related to the data written by the write request 465. If the write request is allocated to the primary database system 405a, the read request would obtain a different result depending on whether the subsequent read transaction is carried out by the primary database system 405a or by the secondary database system 405b.

Load balancing in a HA/DR system, by distributing a portion of the workload of a primary data system to a hot-standby or backup system must be done in a way that does not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary database system and a backup database system must maintain the backup system in an identical, or nearly identical, state as the primary system. Such a solution should also avoid or prohibit any actions which may cause the state of the backup database system to substantially diverge from the state of the primary database system. In this way, in the event of a partial or total failure of the primary database system due to disaster, the backup database system can failover to a primary database system mode with minimal or no impact to client applications.

Figure 5:
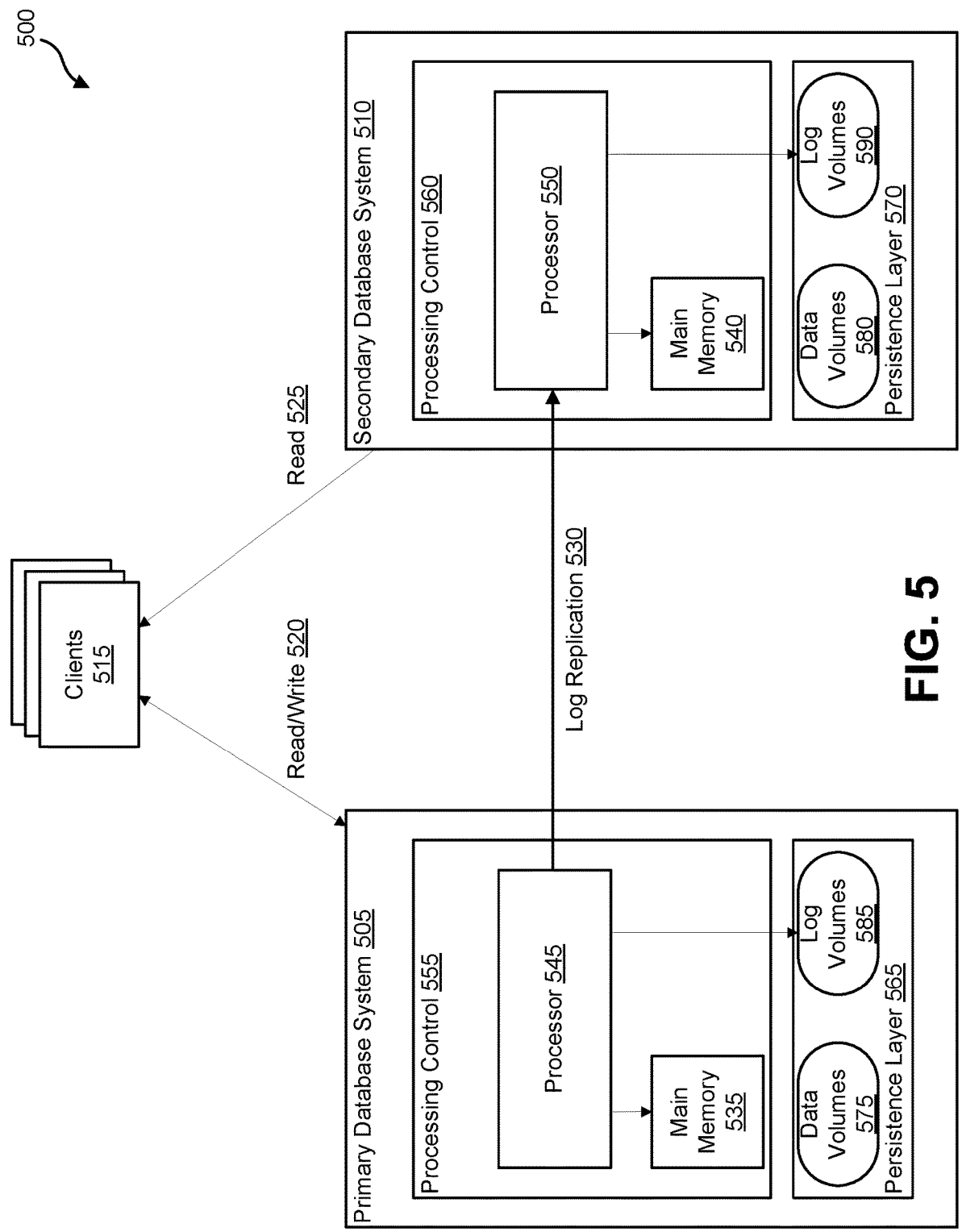
FIG. 5 is a system diagram for illustrating a solution for managing load balancing in a high availability system.

FIG. 5 depicts one possible solution to managing load balancing in a HA/DR system 500. HA/DR system 500 includes a primary database system 505 and a secondary database system 510 and is capable of load balancing between primary database system 505 and secondary database system 510 without interfering with the hot-standby functionality of the secondary database system 510. Each of primary database system 505 and secondary database system 510 may be single instance database systems similar to database system 105 depicted in FIG. 1, or a distributed variation of database system 105 as depicted in FIG. 2. Furthermore, each of primary database system 505 and secondary database system 510 may comprise less, more or all the functionality ascribed to index server 110, 300, name server 115, application server 120, extended store server 125, DDI server 130, data provisioning server 135, and stream cluster 140. But, for simplicity of illustration HA/DR system 500 has been simplified to highlight certain functionality by merely distinguishing between processing control 555, 560 and a persistence layer 565, 570 of each respective system 505, 510.

A collection of clients may each maintain an open connection to both the primary database system 505 and the secondary database system 525. For example, client 515 maintains a read/write connection 520 to the primary database system 505 and a read only connection 525 to the secondary database system 510. Alternatively, client 515 may maintain a read/write connection with each of the primary database system 505 and the secondary database system 510, while processes within the secondary database system 510 itself prohibit execution of any requests that require a write transaction upon the secondary database system while it is in backup mode. Management of load balancing of the workload required by a client application executing at client 515 may be managed by the client 515 application itself. Alternatively, a client 515 application may submit a query request to the primary database system 505. A process control 555 load balancing process executing on processor 545 then may determine where the query should be executed and replies to the client 515 with instructions identifying which system the client 515 should issue the query to.

Primary database system 505 may include an in-memory database in which substantially all actively used data may be kept and maintained in main memory 535 so that operations can be executed without disk I/O, which requires accessing disk storage. Active operations of applications within processing control 555 may cause processor 545 to read and write data into main memory 535 or to disk in the persistence layer 565. Processing control 505 applications may also cause processor 545 to generate transaction logs for capturing data transactions upon the database, which processor 545 then persists in the log volumes 585. As substantially all actively used data may reside in-memory, processing control 555 may interact primarily with data held in main memory while only resorting to data volumes 575 for retrieving and writing less often used data. Additional processes within processing control 555 may be executed by processor 545 to ensure that in-memory data is persisted in persistence layer 565, so that the data is available upon restart or recovery.

Primary database system 505 may be the primary operational system for providing the various functionality necessary to support 24/7 operations. Secondary database system 510 may be a hot-standby, ready to come online with minimal recovery time so as to minimize downtime. Secondary database system 510 may be an identical physical system as primary database system 505, and may be configured in a substantially identical manner in order to enable the secondary database system 510 to provide all the same functionality as primary database system 505. For example, processing control 560 may include all the same applications and functionality as processing control 555, and persistence layer 570 may include data volumes 580 and log volumes 590 that are configured in an identical manner as data volumes 575 and log volumes 585 respectively. Secondary database system 510 may also include an in-memory database kept and maintained primarily in main memory 540.

Primary database system 505 and secondary database system 510 differ in that all requests, from client 515 or otherwise, that require a write transaction are executed only in primary database system 505. Primary database system 505 and secondary database system 510 further differ in that all write transactions are prohibited by the secondary database system 510. In order to propagate changes to the data or the underlying schema from the primary database system 505 to the secondary database system 510, processor 545 also replicates 530 transaction logs directly to the process control 560 of the secondary database system 510. Process control 560 includes one or more applications that cause processor 550 to then replay the transaction logs replicated from the primary database system 505, thereby replaying the transactions at the secondary system 510. As transaction logs are replayed, the various transactions executed at the primary database system become reflected in the secondary database system 510. In order to ensure both the HA functionality and the load balancing functionality, replay of the transaction logs at the secondary system places data in main memory 540, and also persists any data committed in the primary system to persistence layer 570 to be stored by data volumes 580. Replay of the transaction logs at the secondary system 510 may also results in the transaction logs being persisted in log volumes 590.

Transaction logs may be replicated in different ways. Where maintaining a standby system in as close to the same state as the primary system is an important factor, logs may be replicated synchronously meaning that the primary system will not commit a transaction until the secondary successfully responds to the log replication. One appreciates that this will slow performance of the primary system. Conversely, where performance of a primary system is a priority, logs may be replicated asynchronously, in which case the primary operation proceeds with committing transactions without waiting for a response. Various tradeoffs can be made between these two scenarios to achieve a proper level of performance while ensuring replication of critical data.

It will be appreciated from the detailed description above that such a secondary system in standby mode, such as secondary database system 510, can only be as current as its most recently replayed transaction logs. Transaction logs are replicated and replayed at the secondary database system 510 only after a transaction executes in the primary database system 505. Secondary database system 510, therefore, is always slightly behind an associated primary database system 505. Also, there is no guarantee that a query routed to the primary database system in a load balancing effort will be executed before, during or after a particular transaction log is replayed. Thus, the state of the primary database system 505 and the state of the secondary database system will rarely if ever be identical. But, by addressing certain concerns, secondary database system 510 may be kept in a state substantially close to the same state as the primary database system 505 such that the workload required by many operations can be supported by the secondary database system 510.

Although FIG. 5 and the discussion above addresses the use of transaction logs in the context of load balancing and HA/DR, transaction logs can also be used to replicate changes from the primary database system 505 to a secondary database system 510 in a scenario when the secondary system is only being utilized as a back-up of the primary database system 505. In either situation, the purpose of the transaction logs is to replicate changes from the primary database system 505 to the secondary database system 510. Since only transaction logs are shipped to the secondary database 510, the data stored in the primary database system 505 and the secondary database system may be physically different. However, the two sets of data will contain logically the same information (e.g., the page layouts and organization may be different). This type of replication is referred to as logical equivalent replication. In operation, the primary database system 505 and the secondary database system 510 may be considered logical equivalents when data up to the same position in the log transactions exists in both databases.

Figure 6:
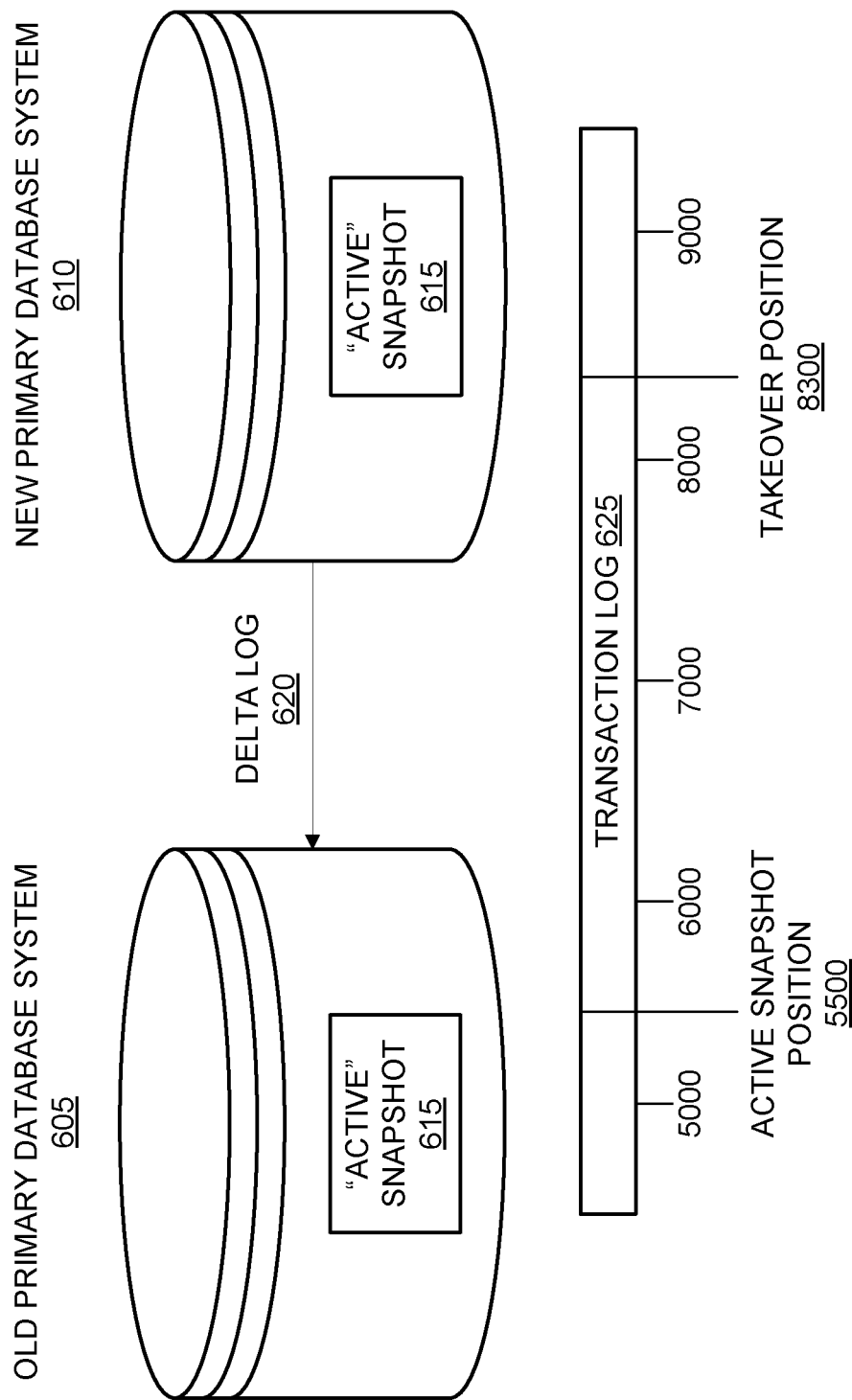
FIG. 6 is a system diagram for illustrating a failback operation using a snapshot and logical equivalent replication.

FIG. 6 is a system diagram for illustrating a failback operation using a snapshot and logical equivalent replication. FIG. 6 illustrates a state of the system after the primary database has experienced a failure and the secondary database system has become the primary database system. Accordingly, the primary database system is identified as the "old" primary database system 605 and the secondary database system is identified the "new" primary database system 610.

In operation, if the primary database system fails for any of a variety of reasons, the secondary database system becomes the new primary database system 610. The old primary database system needs to be restored and the restoration process is referred to a failback. In some embodiments, the old primary database system 605 may become the new secondary database system (roles are switched) or alternatively, the overall system may be restored such that the recovered database system resumes operation as the primary database system. In any event, the old primary database system 605 must be restored to a state that is a logical equivalent of the new primary database system before it can resume operation as a primary or secondary database system.

While the primary database system and the secondary database systems are connected, the primary databases system periodically creates snapshots of the stored database (e.g., the database stored in the persistence layer). As used herein, a snapshot is a definition or state of the database at a particular point in time. It may be a snapshot of the database in the persistence layer and/or the main memory. Additionally, the snapshot may be of a database the primary database system knows is replicated at the secondary database. The snapshot may be identified by a position on the transaction log 625. For example, in FIG. 6, the snapshot 615 is identified as being taken at transaction log position 5500. In some embodiments, the primary database system may create the snapshot 615, confirm the state of the snapshot 615 is also present on the secondary database system and then mark the snapshot as "ACTIVE". In some embodiments, after the snapshot is marked as being active, older snapshots may be deleted.

In the event of a failure of the primary database system, the secondary database system takes over as the new primary database system 610. This failure/takeover may also be identified by a position on the transaction log 625. FIG. 6, illustrates the failure and takeover as occurring at takeover position 8300 of the transaction log 625 which is later in time than position 5500. As a result of the failure of the database system 605, the transaction log 625 between the two database systems may differ after position 8300. In particular, since the database system 605 and the database system 610 are not connected, the transaction log 625 after position 8300 may reflect certain transactions on one database that are not reflected on the other database. In some embodiments, this may also occur if the two databases are running in parallel.

Once the old primary database system 605 returns to an operational mode, a failback operation to restore the state of the old primary database system 605 is performed. Initially, the old primary database system 605 is registered as on the system (e.g., as a new secondary database system). Then the old primary database system 605 identifies a snapshot 615 located in persistence storage on the primary database 605.

In some embodiments, the snapshot 615 may be an active snapshot that is confirmed to exist on the new primary database 610. In some embodiments, the snapshot 615 may be the most recent available snapshot 615. The snapshot 615 is restored to main memory within the old primary database 605. The old primary database system then communicates with the new primary database system 610 to obtain the transaction log from the new primary database 610. The new primary database 610 sends the log information back to the old primary database system 605. In particular, the log information is a delta log 620 that includes transaction information for all transactions performed by the new primary database system after the log position corresponding to the snapshot (e.g., log position 5500 in FIG. 6). Once the delta log is replayed on the old primary database system 605, both databases are logically equivalent.

During the failback operation, any transactions performed by the old primary database system 8300 that were not communicated to the new primary database system after the takeover are lost because they are not reflected in the transaction log located on the new primary database system. In some embodiments, this may be acceptable since it may be desirable to have any conflicts between transactions on the database system resolved in favor of the new primary database system 610.

Figure 7:
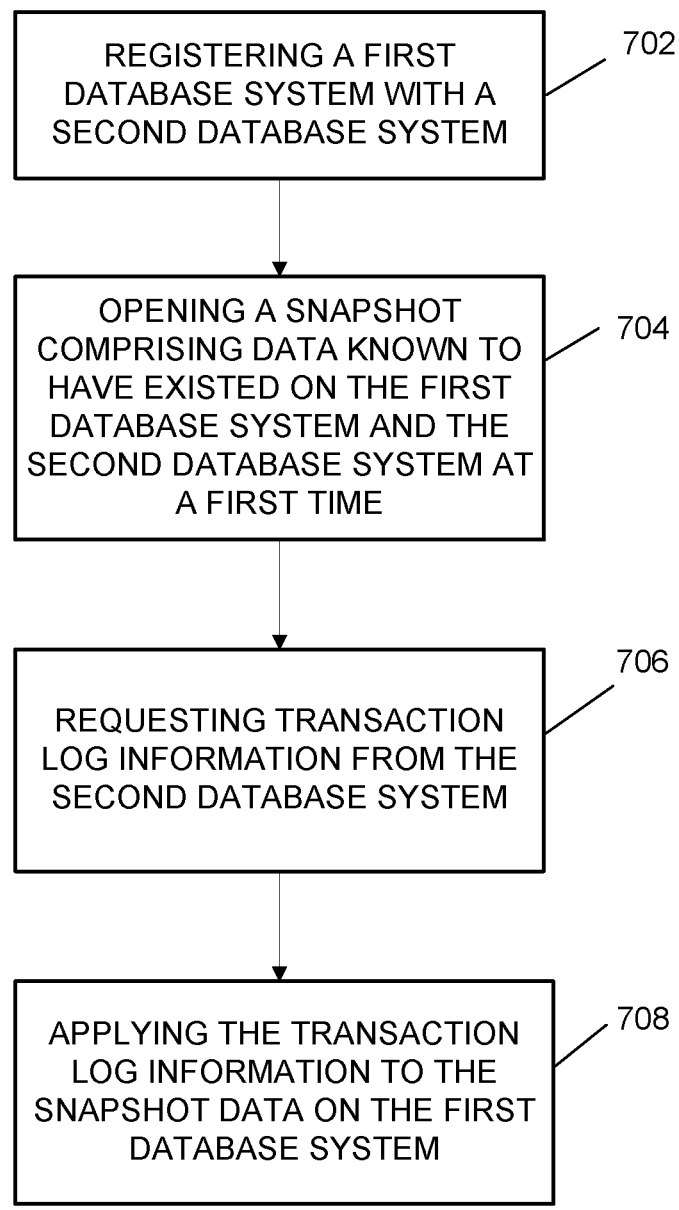
FIG. 7 is a flowchart illustrating an exemplary operation of a failback operation using a snapshot and logical equivalent replication.

FIG. 7 is a flowchart illustrating an exemplary operation of a failback operation using a snapshot and logical equivalent replication. In some embodiments, the process may be performed on the recently recovered database system (e.g., the old primary database system 605). In operation 702, the old primary database system 605 registers with the new primary database system. In some embodiments, the old primary database system 605 may register to be a new secondary database system in an HA/DR and/or load balancing operation. Then the old primary database system performs a failback operation. In operation 704 of the failback operation, the old primary database system 605 opens a snapshot comprising data known to have existed on the old primary database system 605 and the new primary database system at a first time. In some embodiments, the snapshot may be the most recent snapshot or alternatively, an earlier snapshot. In operation 706, the old primary database system 605 requests transaction log information from the new primary database system 610. The requested transaction log information corresponds to transactions performed on the new primary database system beginning with the first time. After the old primary database system 605 receives the transaction log information it applies the transaction log information to the snapshot data on the first database system in operation 708. The transaction log information may include transactions up to a current time or sometime earlier. After applying the transaction log information to the snapshot data on the old primary database system 605 in operation 708, the data on the first database system is logically equivalent to data on the new primary database system 610.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method comprising:
registering a first database system comprising a first processor and a first memory with a separate and distinct second database system comprising a second processor and a second memory, the first database system comprises multiple snapshots; and
performing a failback operation to restore a state of the first database system comprising:
identifying a most recent snapshot in persistence storage of the second database system that is also present in persistent storage on the first database system, the most recent snapshot being identified as an active snapshot;
opening the snapshot comprising data known to have existed on the first database system and the second database system at a first time;
requesting transaction log information from the second database system, the transaction log information being a delta log corresponding to transactions performed on the second database system beginning with the first time; and
applying the transaction log information to the snapshot data on the first database system;
wherein:
older snapshots are deleted after the opened snapshot is identified as an active snapshot;
after applying the transaction log information to the snapshot data on the first database system, the data on the first database system is logically equivalent and physically different to data on the second database system.

2. The method of claim 1, wherein the transaction log includes transaction through a current time.

3. The method of claim 1, wherein the snapshot is retrieved from a persistent storage and saved to a main memory located within the first database system.

4. The method of claim 1, wherein the first database system registers as a new secondary database system and the second database system is a primary database system.

5. The method of claim 4, wherein the second database system became the primary database system at a second time after the first time.

6. The method of claim 5, wherein any transactions on the first database system that occurred after the second time are lost after performing the failback operation.

7. The method of claim 1, wherein the first database system and the second database system are in memory database (IMDB) systems.

8. A system comprising:
a processor; and
a non-transitory computer readable media having computer executable instructions stored therein, which, when executed by the processor, causes the system to perform operations comprising:
registering a first database system comprising a first processor and a first memory with a separate and distinct second database system comprising a second processor and a second memory, the first database system comprises multiple snapshots; and
performing a failback operation to restore a state of the first database system comprising:
identifying a most recent snapshot in persistence storage of the second database system that is also present in persistent storage on the first database system, the most recent snapshot being identified as an active snapshot;
opening the snapshot comprising data known to have existed on the first database system and the second database system at a first time;
requesting transaction log information from the second database system, the transaction log information being a delta log corresponding to transactions performed on the second database system beginning with the first time; and
applying the transaction log information to the snapshot data on the first database system;
wherein:
older snapshots are deleted after the opened snapshot is identified as an active snapshot;
after applying the transaction log information to the snapshot data on the first database system, the data on the first database system is logically equivalent and physically different to data on the second database system.

9. The system of claim 8, wherein the transaction log includes transaction through a current time.

10. The system of claim 8, wherein the snapshot is retrieved from a persistent storage and saved to a main memory located within the first database system.

11. The system of claim 8, wherein the first database system registers as a new secondary database system and the second database system is a primary database system.

12. The system of claim 11, wherein the second database system became the primary database system at a second time after the first time.

13. The system of claim 12, wherein any transactions on the first database system that occurred after the second time are lost after performing the failback operation.

14. The system of claim 8, wherein the first database system and the second database system are in memory database (IMDB) systems.

15. A non-transitory computer program product storing instructions which, when executed by at least one processor, result in operations comprising:
registering a first database system comprising a first processor and a first memory with a separate and distinct second database system comprising a second processor and a second memory, the first database system comprises multiple snapshots; and
performing a failback operation to restore a state of the first database system comprising:
identifying a most recent snapshot in persistence storage of the second database system that is also present in persistent storage on the first database system, the most recent snapshot being identified as an active snapshot;
opening the snapshot comprising data known to have existed on the first database system and the second database system at a first time;
requesting transaction log information from the second database system, the transaction log information being a delta log corresponding to transactions performed on the second database system beginning with the first time; and
applying the transaction log information to the snapshot data on the first database system;
wherein:
older snapshots are deleted after the opened snapshot is identified as an active snapshot;
after applying the transaction log information to the snapshot data on the first database system, the data on the first database system is logically equivalent and physically different to data on the second database system.

16. The non-transitory computer program product of claim 15, wherein the transaction log includes transaction through a current time.

17. The non-transitory computer program product of claim 15, wherein the snapshot is retrieved from a persistent storage and saved to a main memory located within the first database system.

18. The non-transitory computer program product of claim 15, wherein the first database system registers as a new secondary database system and the second database system is a primary database system.

19. The non-transitory computer program product of claim 15, wherein the second database system became the primary database system at a second time after the first time, and wherein any transactions on the first database system that occurred after the second time are lost after performing the failback operation.

20. The non-transitory computer program product of claim 15, wherein the first database system and the second database system are in memory database (IMDB) systems.

* * * * *